US011483213B2

(12) United States Patent
Engelberg et al.

(10) Patent No.: US 11,483,213 B2
(45) Date of Patent: Oct. 25, 2022

(54) ENTERPRISE PROCESS DISCOVERY THROUGH NETWORK TRAFFIC PATTERNS

(71) Applicant: Accenture Global Solutions Limited, Dublin (IE)

(72) Inventors: Gal Engelberg, Pardes-hana (IL); Eitan Hadar, Nesher (IL); Avraham Dayan, Bnei Brak (IL); Moshe Hadad, Rosh HaAyim (IL)

(73) Assignee: Accenture Global Solutions Limited, Dublin (IE)

( * ) Notice: Subject to any disclaimer, the term of this patent is extended or adjusted under 35 U.S.C. 154(b) by 71 days.

(21) Appl. No.: 16/924,489

(22) Filed: Jul. 9, 2020

(65) Prior Publication Data
US 2022/0014445 A1     Jan. 13, 2022

(51) Int. Cl.
*H04L 41/16*     (2022.01)
*G06K 9/62*     (2022.01)
(Continued)

(52) U.S. Cl.
CPC ............ *H04L 41/16* (2013.01); *G06K 9/6219* (2013.01); *G06K 9/6256* (2013.01); *G06N 20/00* (2019.01); *H04L 67/14* (2013.01); *H04L 67/535* (2022.05)

(58) Field of Classification Search
CPC .... G06K 9/6219; G06K 9/6256; G06N 20/00; H04L 41/16; H04L 67/14; H04L 67/22
See application file for complete search history.

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experienc>, retrieved on Jul. 9, 2021, retrieved from URL<https://ifwe.3ds.com/transportation-mobility/new-customer-experience>, 9 pages.

(Continued)

*Primary Examiner* — Thomas J Dailey
(74) *Attorney, Agent, or Firm* — Fish & Richardson P.C.

(57) ABSTRACT

Implementations of the present disclosure include executing, within a computer network, multiple instances of a process, each instance including a simulation of execution of the process within the computer network, receiving session datasets representative of sessions performed during execution of each instance of the process, generating a set of session traces, each session trace representing a sequence of sessions performed during an instance of the process within the computer network, processing the set of session traces using a clustering algorithm to cluster sessions of each session trace into two or more clusters, each cluster having an associated label, and providing a process model that generically represents multiple executions of the process within the computer network, the process model comprising a sequence of labels of the two or more clusters corresponding to session traces in the set of session traces.

17 Claims, 5 Drawing Sheets

(51) Int. Cl.
 *H04L 67/14* (2022.01)
 *G06N 20/00* (2019.01)
 *H04L 67/50* (2022.01)

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1* | 12/2020 | Ismailsheriff ........... H04L 47/27 |
| 10,956,566 B1 | 3/2021 | Shu et al. |
| 10,958,667 B1 | 3/2021 | Maida et al. |
| 11,089,040 B2 | 8/2021 | Jang et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0301765 A1 | 12/2008 | Nicol et al. |
| 2009/0077666 A1 | 3/2009 | Chen et al. |
| 2009/0307772 A1 | 12/2009 | Markham et al. |
| 2009/0319248 A1* | 12/2009 | White ................. G09B 19/0053 703/13 |
| 2010/0058456 A1 | 3/2010 | Jajodia et al. |
| 2010/0138925 A1 | 7/2010 | Barai et al. |
| 2010/0174670 A1* | 7/2010 | Malik ..................... G06F 16/35 706/12 |
| 2011/0035803 A1 | 2/2011 | Lucangeli Obes et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1* | 7/2015 | Lin ..................... H04L 41/5038 718/1 |
| 2015/0261958 A1 | 9/2015 | Hale et al. |
| 2015/0326601 A1 | 11/2015 | Grondin et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0373005 A1 | 12/2019 | Bassett |
| 2020/0014265 A1 | 1/2020 | Whebe Spiridon et al. |
| 2020/0014718 A1 | 1/2020 | Joseph Durairaj et al. |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1* | 4/2020 | Inamdar .................. H04L 67/14 |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0168175 A1 | 6/2021 | Crabtree et al. |
| 2021/0173711 A1 | 6/2021 | Crabtree et al. |
| 2021/0248443 A1 | 8/2021 | Shu et al. |
| 2021/0273978 A1 | 9/2021 | Hadar et al. |
| 2021/0336981 A1 | 10/2021 | Akella et al. |
| 2021/0409426 A1 | 12/2021 | Engelberg et al. |
| 2021/0409439 A1 | 12/2021 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0188460 A1 | 6/2022 | Hadar et al. |
| 2022/0263855 A1 | 8/2022 | Engelberg et al. |

FOREIGN PATENT DOCUMENTS

| | | |
|---|---|---|
| EP | 2385676 | 11/2011 |
| EP | 2816773 | 12/2014 |
| EP | 3664411 | 6/2020 |
| WO | WO 2018/002484 | 1/2018 |
| WO | WO 2020/242275 | 12/2020 |

OTHER PUBLICATIONS

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

(56) References Cited

OTHER PUBLICATIONS

EP Search Report in European Application. No. 21159421.3, dated Jun. 30, 2021, 11 pages.
Foundations of Databases, 1st ed., Abiteboul et al. (eds.), 1995, Chapter 12, 38 pages.
GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.
Hansen et al., "Model-in-the-Loop and Software-in-the-Loop Testing of Closed-Loop Automotive Software with Arttest," Informatik, 2017, 13 pages.
Hofner et al., "Dijkstra, Floyd and Warshall meet Kleene," Formal Aspects of Computing, Jul. 2012, 24(4-6):459-476.
Idika et al., "Extending attack graph-based security metrics and aggregating their application," IEEE Transactions on Dependable and Secure Computing, Jan./Feb. 2012, 9(1):75-85.
IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.
Ingols et al., "Practical Attack Graph Generation for Network Defense," 2006 22nd Annual Computer Security Applications Conference (ACSAC'06), Miami Beach, Florida, Dec. 11-15, 2006, 10 pages.
Li et al., "Cluster security research involving the modeling of network exploitations using exploitation graphs," Proceedings of the IEEE International Symposium on Cluster Computing and the Grid, Singapore, May 16-19, 2006, 11 pages.
Lippmann et al., "Validating and restoring defense in depth using attack graphs," Proceedings of the Military Communications Conference, Washington, DC, USA, Oct. 23-25, 2006, 10 pages.
Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.
MaschinenMarkt.international [online], "Digital twin in the automobile industry," Aug. 1, 2019, retrieved on Jul. 9, 2021. retrieved from URL<https://www.maschinenmarkt.international/digital-twin-in-the-automobile-industry-a-851549/>, 3 pages.
Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.
Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.
Noel et al., "CyGraph: Graph-Based Analytics and Visualization for Cybersecurity," Handbook of Statistics, Jan. 2016, 35:117-167.
Ortalo et al., "Experimenting with quantitative evaluation tools for monitoring operational security," IEEE Transactions on Software Engineering, Sep./Oct. 1999, 25(5):633-650.
Phillips et al., "A graph-based system for network-vulnerability analysis," Proceedings of the 1998 Workshop on New Security Paradigms, Charlottesville, Virginia, Sep. 22-26, 1998, 71-79.
Shi et al., "Normalized Cuts and Image Segmentation," IEEE Transactions on Pattern Analysis and Machine Intelligence, Aug. 2000, 22(8):888-905.
Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.
SMMT.co.uk [online], "Role of Digital Twin in Automotive Industry," Dec. 17, 2018, retrieved on July 9. 2021, retrieved from URL<https://www.smmt.co.uk/2018/12/role-of-digital-twin-in-automotive-industry/>, 9 pages.
Stanek et al., "Method of comparing graph differencing algorithms for software differencing," 2008 IEEE International Conference on Electro/Information Technology, Ames, Iowa, May 18-20, 2008, 482-487.
Swiler et al., "A graph-based network-vulnerability analysis system," Sandia National Laboratories, 1997, Tech. Rep. SAND97-3010/1, 25 pages.
TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.
The Fourth Industrial Revolution, 1st. ed., Schwab, Jan. 2017, 218 pages.
Vehicle Power Management, 1st ed., Zhang et al. (eds.), Aug. 2011, Chapter 10, 27 pages.
Ward et al., "Threat Analysis and Risk Assessment in Automotive Cyber Security," SAE Int. J. Passeng. Cars Electron. Electr. Systems, May 2013, 6(2):507-513.
Wikipedia.org [online], "5G," last updated Jul. 9, 2021, retrieved on Jul. 9, 2021, retrieved from URL<https://en.wikipedia.org/wiki/5G>, 29 pages.
Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.
Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.
Wikipedia.org [online], "Digital twin," last updated Jul. 8, 2021, retrieved on Jul. 9, 2021, retrieved from URL<https://en.wikipedia.org/wiki/Digital_twin>, 13 pages.
Yi et al., "Overview on attack graph generation and visualization technology," 2013 International Conference on Anti-Counterfeiting, Security and Identification (ASID), Shanghai, China, Oct. 25-27, 2013, 6 pages.
Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.
Zhao et al., "Attack graph analysis method for large scale network security hardening," J. Front. Comput. Sci. Technology, 2018, 12(2):263-273 (with English Abstract).
EP Extended Search Report in European Appln. No. 21191752.1, dated Jan. 4, 2022, 8 pages.
Barik et al., "Attack Graph Generation and Analysis Techniques," Defence Science Journal, Nov. 2016, 66(6):559-567.
Barrère et al., "Naggen: a NetWork Attack Graph GENeration Tool—IEE CNS 17 Poster," 2017 IEEE Conference on Communications and Network Security, Oct. 2017, Las Vegas, NV, USA, 378-379.
Bonacich, "Power and Centrality: A Family of Measures," American Journal of Sociology, Mar. 1987,92(5):1170-1182.
Cohen-Addad et al., "Hierarchical Clustering: Objective Functions and Algorithms," Journal of the ACM, Jun. 2019, 66(4):26, 42 pages.
EP Search Report in European Application No. EP 19212981, dated Mar. 4, 2020, 6 pages.
EP Search Report in European Application No. EP13290145, dated Nov. 12, 2013, 2 pages.
EP Search Report in European Application No. E19212974, dated Feb. 14, 2020, 8 pages.
EP Search Report in European Application No. EP19212976, dated Feb. 14, 2020, 8 pages.
Fundamentals of Business Process Management, 2nd ed., Dumas et al. (eds.), 1998, 546 pages.
Hadar et al., "Big Data Analytics on Cyber Attack Graphs for Prioritizing Agile Security Requirements", Proceedings of the 2019

(56) References Cited

OTHER PUBLICATIONS

IEEE 27th International Requirements Engineer ing Conference, Sep. 23-27, 2019, Jeju Island, Kora, 330-339.
Manning Free Content Center [online], "Building Your Vocabulary," dated May 19, 2017, retrieved on Jun. 3, 2020, retrieved from URL <https://freecontent.manning.com/building-your-vocabulary/>, 10 pages.
National Institute of Standards and Technology [online], "National Vulnerability Database," last updated Jun. 2, 2020, retrieved on Jun. 3, 2020, retrieved from URL<https://nvd.nist.gov/>, 4 pages.
Networks: An Introduction, Newman (ed.), May 2010, 789 pages.
Ou et al., "A Scalable Approach to Attack Graph Generation," Proceedings of the 13th ACM Conference on Computer and Communication Security, Oct. 2006, 336-345.
Ou et al., "MulVAL: A Logic-based Network Security Analyzer," 14th USENIX Security Symposium, Aug. 2005, Baltimore, MD, USA, 16 pages.
Process Mining, 1st ed., van der Aalst, 2011, Chapters 5-6, 63 pages.
Purvine et al., "A Graph-Based Impact Metric for Mitigating Latheral Movement Cyber Attacks", Automated Descision Making for Active Cyber Defence, Oct. 2016, pp. 45-52.
Sourceforge.net [online], "XSB," last updated Oct. 29, 2017, retrieved on Jun. 3, 2020, retrieved from URL <http://xsb.sourceforge.net/>, 2 pages.
The MITRE Corporation [online], "MITRE ATT&CK," last updated May 27, 2020, retrieved on Jun. 3, 2020, retrieved from URL <https://attack.mitre.org/>, 3 pages.
Ullah et al., "Towards Modeling Attacker's Opportunity for Improving Cyber Resilience in Energy Delivery Systems", Resilience Week, Aug. 2018, pp. 100-107.
Wang et al., "Exploring Attack Graph for Cost-benefit Security Hardening: A Probabilistic Approach," Computers & Security, Feb. 2013, 32:158-169.
Wikipedia.org [online], "Active Directory," last updated Jun. 1, 2020, retrieved on Jun. 3, 2020, retrieved from URL <https://en.wikipedia.org/wiki/Active_Directory>, 14 pages.
Wikipedia.org [online], "Backward Chaining," last updated Nov. 16. 2019, retrieved on Jun. 3, 2020, retrieved from URL <https://en.wikipedia.org/wiki/Backward_chaining>, 3 pages.
Wikipedia.org [online], "Cartesian Product," last updated Feb. 28, 2020, retrieved on Jun. 3, 2020, retrieved from URL <https://en.wikipedia.org/wiki/Cartesian_product>, 9 pages.
Wikipedia.org [online], "Centrality," last updated May 29, 2020, retrieved on Jun. 3, 2020, retrieved from URL <https://en.wikipedia.org/wiki/Centrality>, 15 pages.
Wildpedia.org [online], "Flood Fill," last updated Dec. 24, 2019, retrieved on Jun. 3, 2020, retrieved from URL <https://en.wikipedia.org/wiki/Flood_fill>, 7 pages.
Wikipedia.org [online], "Forward Chaining," last updated Nov. 18, 2019, retrieved on June 3, 2020, retrieved from URL <https://en.wikipedia.org/wiki/Forward_chaining>, 3 pages.
Wikipedia.org [online], "Look-ahead (backtracking)," last updated May 23, 3030, retrieved on Jun. 3, 2020, retrieved from URL <https://en.wikipedia.org/wiki/Look-ahead_(backtracking)>, 3 pages.
Wikipedia.org [online], "SCADA," last updated Jun. 2, 2020, retrieved on Jun. 3, 2020, retrieved from URL <https://en.wikipedia.org/wiki/SCADA>, 12 pages.
Borgatti et al., "A Graph-theoretic perspective on centrality," Social Networks, Oct. 2006, 28(4):466-484.
EP Search Report in European Application. No. EP20185251, dated Oct. 21, 2020, 7 pages.
Wang et al., "A Network Vulnerability Assessment Method Based on Attack Graph," 2018 IEEE 4th International Conference on Computer and Communications, Dec. 7-10, 2018, Chengdu, China, 1149-1154.
Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.
Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.
Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.
Narmeen Zakaria Bawany; DDoS Attack Detection and Mitigation Using SON: Methods, Practices, and Solutions; Springer-2017; p. 425-441.
Alvarenga et al., "Discovering Attack Strategies Using Process Mining," Presented at Proceedings of The Eleventh Advanced International Conference on Telecommunications, Brussels, Belgium, Jun. 21-26, 2015, 119-125.
Chen et al., "Distributed Attack Modeling Approach Based on Process Mining and Graph Segmentation," Entropy, Sep. 2020, 22(9):1026, 21 pages.
Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.
IEEE, "IEEE Standard for eXtensible Event Stream (XES) for Achieving Interoperability in Event Logs and Event Stream," IEEE Std 1849™-2016, Sep. 22, 2016, 50 pages.
Murata, "Petri Nets: Properties, Analysis and Applications," Proceedings of the IEEE, Apr. 1989, 77(4):541-580.
Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.
Neo4j.com [online], "Yen's K-Shortest Paths," available on or before Aug. 6, 2020 via Internet Archive: Wayback Machine URL<https://web.archive.org/web/20200806185626/https://neo4j.com/does/graph-data-science/current/alpha-algorithms/yen-s-k-shortest-path/, retrieved on Jul. 28, 2021, retrieved from URL<https://web.archive.org/web/20200806185626/https://neo4j.com/does/graph-data-science/current/alpha-algorithms/yen-s-k-shortest-path/>, 5 pages.
PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.
PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.
Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.
Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.
Wikipedia.org [online], "Depth-first search," last updated Jun. 16, 2021, retrieved on July 28, 2021, retrieved from URL<https://en.wikipedia.org/wiki/Depth-first search>, 8 pages.
Abraham et al., "Cyber Security Analytics: A Stochastic Model for Security Quantification Using Absorbing Markov Chains," Journal of Communications, Dec. 2014, 9(12):899-907.
Atoum et al., "A holistic cyber security implementation framework," Information Management & Computer Security, Jul. 2014, 22(3):251-264.
Fielder et al., "Decision support approaches for cyber security investment," Decision Support Systems, Jun. 2016, 86:13-23.
Gergeleit et al., "Modeling Security Requirements and Controls for an Automated Deployment of Industrial IT Systems," Kommunika- (56) References Cited

OTHER PUBLICATIONS tion und Bildverarbeitung in der Automation. Technologien für die intelligente Automation (Technologies for Intelligent Automation), Jan. 14, 2020, 12:217-231.
Grieves, "Virtually Intelligent Product Systems: Digital and Physical Twins", Complex Systems Engineering: Theory and Practice, Jul. 2019, 256:175-200.
Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.
Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.
Husák et al., "Survey of Attack Projection, Prediction, and Forecasting in Cyber Security," IEEE Communications Surveys & Tutorials, Sep. 24, 2018, 21(1):640-660.
International Organization for Standardization, "International Standard: ISO/IEC 27001," ISO/IEC 27001:2013(E), Oct. 1, 2013, 29 pages.
Joint Task Force Transformation Initiative, "Security and Privacy Controls for Federal Information Systems and Organizations," National Institute of Standards and Technology Special Publication 800-53, Revision 4, Jan. 22, 2015, 462 pages.
Khouzani et al., "Scalable min-max multi-objective cyber-security optimization over probabilistic attack graphs", European Journal of Operational Research, Nov. 1, 2019, 278(3):894-903.
Schatz et al., "Economic valuation for information security investment: a systematic literature review," Information Systems Frontiers, Apr. 18, 2016, 19:1205-1228.
Shandilya et al., "Use of Attack Graphs in Security Systems", Hindawi Journal of Computer Networks and Communications, Oct. 20, 2014, 2014:818957, 14 pages.
Strom et al., "MITRE ATT&CK™: Design and Philosophy", The MITRE Corporation, Jul. 2018, 37 pages.
Wikipedia.org [online], "Centrality," last updated Oct. 18, 2020, retrieved on Oct. 26, 2020, retrieved from URL<https://en.wikipedia.org/wiki/Centrality>, 15 pages.
Wikipedia.org [online], "SWOT analysis," last updated Oct. 20, 2020, retrieved on Oct. 26, 2020, retrieved from URL<https://en.wikipedia.org/wild/SWOT_analysis>, 8 pages.
Wikipedia.org [online], "Traffic congestion," last updated Oct. 5, 2020, retrieved on Oct. 26, 2020, retrieved from URL<https://en.wikipedia.org/wiki/Trafftc_congestion>, 24 pages.
Wildpedia.org [online], "Traffic flow," last updated Oct. 19, 2020, retrieved on Oct. 26, 2020, retrieved from URL<https://en.wikipedia.org/wiki/Traffic_flow>, 41 pages.
Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.
Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.
You et al., "A Review of Cyber Security Controls from an ICS Perspective," Proceedings of 2018 International Conference on Platform Technology and Service (PlatCon), Jan. 29-31, 2018, Jeju, South Korea, 5 pages.
Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Optimal Decision-Making Approach for Cyber Security Defense Using Game Theory and Intelligent Learning," Security and Communication Networks, Dec. 23, 2019, 2019:3038586, 17 pages.
Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).
X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).
Kaloroumakis et al., "Toward a Knowledge Graph of Cybersecurity Countermeasures," Technical Report, The MITRE Corporation, 2021, 11 pages.
MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.
MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.
MITRE.org [online], "Service Application," available on or before Jun. 25, 2021 via Internet Archive: Wayback Machine URL<https://web.archive.org/web/20210625024952/hLLps://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.
Wikipedia.org [online], "Reachability," last updated Oct. 22, 2021, retrieved on Jul. 13, 2022, retrieved from URL<https://en.wikipedia.org/wiki/Reachability>, 5 pages.
Brazhuk, "Towards automation of threat modeling based on a semantic model of attack patterns and weaknesses," arXiv, Dec. 8, 2021, arXiv:2112.04231v1, 14 pages.
EP Extended Search Report in European Appln. No. 22157487.4, dated Jun. 9, 2022, 10 pages.
Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.
Hemberg et al., "Using a Collated Cybersecurity Dataset for Machine Learning and Artificial Intelligence," arXiv, Aug. 5, 2021, arXiv:2108.02618v1, 5 pages.
Horrocks et al., "SWRL: A Semantic Web Rule Language Combining OWL and RuleML," W3C Member Submission, May 21, 2004, 24 pages.
Neo4j.com [online], "Topological link prediction," available on or before May 17, 2020, via Internet Archive: Way back Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.
Rossi et al., "Knowledge Graph Embedding for Link Prediction: A Comparative Analysis," arXiv, Feb. 3, 2020, arXiv:2002.00819v1, 42 pages.
Wikipedia.org [online], "Natural language processing," last updated Jun. 10, 2022, retrieved on Jun. 14, 2022, retrieved from URL<https://en.wikipedia.org/wiki/Natural_language_processing>, 13 pages.
Abraham et al. "A Predictive Framework for Cyber Security Analytics Using Attack Graphs." International Journal of Computer Networks & Communications (IJCNC). vol. 7, No. 1, Jan. 2015. (Year: 2015).

* cited by examiner

ENTERPRISE PROCESS DISCOVERY THROUGH NETWORK TRAFFIC PATTERNS

BACKGROUND

Enterprises execute operations across one or more networks of components, commonly referred to as computer networks. A computer network is made up of multiple interconnected components that communicate with one another to facilitate execution of enterprise operations. Example components can include computers, servers, database systems, and the like. Enterprise operations can include processes that are executed across multiple components within a network.

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

An important aspect in mitigating attacks is an understanding of the relationship between a process and component within a network that executes the process. This can be referred to as process discovery within computer networks. An approach to process discovery within computer networks needs to address multiple technical challenges.

SUMMARY

Implementations of the present disclosure are directed to process discovery in computer networks. More particularly, implementations of the present disclosure are directed to automated process discovery in computer networks by correlating network traffic to process execution. As described in further detail herein, implementations of the present disclosure enable mapping between processes (i.e., that are executed as part of enterprise operations) to infrastructure assets (i.e., components with a network) and providing knowledge to potential attack paths when analyzing enterprise readiness against cyberattack. Further, implementations of the present disclosure enable automated labeling of enterprise activities over network traffic streams to support activities, such as machine-learning (ML).

In some implementations, actions include executing, within a computer network, multiple instances of a process, each instance including a simulation of execution of the process within the computer network, receiving session datasets representative of sessions performed during execution of each instance of the process, generating a set of session traces, each session trace representing a sequence of sessions performed during an instance of the process within the computer network, processing the set of session traces using a clustering algorithm to cluster sessions of each session trace into two or more clusters, each cluster having an associated label, and providing a process model that generically represents multiple executions of the process within the computer network, the process model comprising a sequence of labels of the two or more clusters corresponding to session traces in the set of session traces. Other implementations of this aspect include corresponding systems, apparatus, and computer programs, configured to perform the actions of the methods, encoded on computer storage devices.

These and other implementations can each optionally include one or more of the following features: the clustering algorithm includes a hierarchical clustering algorithm; actions further include generating a set of activity traces based on the set of session traces and labels of the two or more clusters; the process model is provided based on a process discovery technique that is executed on the set of activity traces; actions further include comparing network traffic of actual execution of processes within the computer network to a set of process models, the set of process models including the process model, and identifying the process as having been actually executed in the computer network based on the comparing; actions further include training a machine-learning (ML) model at least partially based on the process model; and the computer network assets include information technology (IT) components and operational technology (OT) components, each session being associated with communication between multiple IT components.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to process discovery in computer networks. More particularly, implementations of the present disclosure are directed to automated process discovery in computer networks by correlating network traffic to process execution. In some implementations, actions include executing, within a computer network, multiple instances of a process, each instance including a simulation of execution of the process within the computer network, receiving session datasets representative of sessions performed during execution of each instance of the process, generating a set of session traces, each session trace representing a sequence of sessions performed during an instance of the process within the computer network, processing the set of session traces using a clustering algorithm to cluster sessions of each session trace into two or more clusters, each cluster having an associated label, and providing a process model that generically represents multiple executions of the process within the computer network, the process model comprising a sequence of labels of the two or more clusters corresponding to session traces in the set of session traces.

To provide context for implementations of the present disclosure, and as introduced above, enterprises execute operations across one or more networks of components, commonly referred to as computer networks. A computer network is made up of multiple interconnected components that communicate with one another to facilitate execution of enterprise operations. Example components can include computers, servers, database systems, and the like. Enterprise operations can include processes that are executed across multiple components within a network.

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. For example, one or more dashboards can be provided, which provide lists of alerts that are to be addressed by the security personnel.

An important aspect in mitigating attacks is an understanding of the relationship between a process and component within a network that executes the process. This can be referred to as process discovery within computer networks. An approach to process discovery within computer networks needs to address multiple technical challenges. An example challenge includes scalability. Most modern computer networks generate massive amounts of traffic data, where most of the traffic data is related to system operations, not to process execution. Discerning traffic data representative of process execution can be resource-intensive and error prone. Another example challenge is capturing granularity versus analysis granularity. For example, traffic data is captured in a packet granularity, each packet typically holding only a fraction of a message. Consequently, packets would need to be aggregated to create meaningful content that can associate packets with process execution. Another example challenge includes encryption. Typically, part of, if not all of the traffic data is encrypted. Decrypting traffic data in an effort to associate the traffic data with process execution is a resource-intensive task and might not even be possible in some instances.

Still another example challenge includes variance among instances of process execution. For example, there is a variance between different instances of execution of the same process. Consequently, techniques such as searching a specific traffic signature (Boolean logic) of process execution are not applicable. Another example challenge includes domain knowledge. That is, to analyze network traffic streams, there is a need of prior knowledge regarding packet structure, protocols levels and their properties, and the like. Another example challenge includes concurrency, in which packets of multiple data objects could be shuffled across datasets within a computer network.

In view of the above context, implementations of the present disclosure are directed to process discovery in computer networks. More particularly, implementations of the present disclosure are directed to automated process discovery in computer networks by correlating network traffic to process execution. In general, implementations of the present disclosure address technical challenges, such as those described above, by providing process discovery through analysis of network traffic patterns, in which pattern matching is used to identify instances of process execution over network traffic streams. As described in further detail herein, implementations of the present disclosure enable mapping between processes (i.e., that are executed as part of enterprise operations) to infrastructure assets (i.e., components with a network) and providing knowledge to potential attack paths when analyzing enterprise readiness against cyberattack. For example, knowledge on which components are executing which processes enable assessment on the impact a cyberattack would have on enterprise operations (e.g., which processes would be impacted and to what extent, if a particular component were compromised). Further, implementations of the present disclosure enable automated labeling of enterprise activities over network traffic streams to support further machine-learning (ML) activities.

To provide further context for implementations of the present disclosure, a computer network is made up of multiple network components, which can be referred to as configuration items (CIs). Example network components can include, without limitation, servers (e.g., web servers, application servers, mail servers, network servers, proxy servers), databases, desktop computers, laptop computers, and the like. Within a computer network, the network components are connected within a network topology. Network components can include information technology (IT) components and operation technology (OT) components. In general, IT components can be described as hardware and/or software for storage, retrieval, transmission, and manipulation of data within a network. In general, OT components can be described as hardware and/or software that detects changes and/or causes changes within a network by the directly monitoring and/or controlling physical devices, processes, and/or events within the network.

Figure 1:
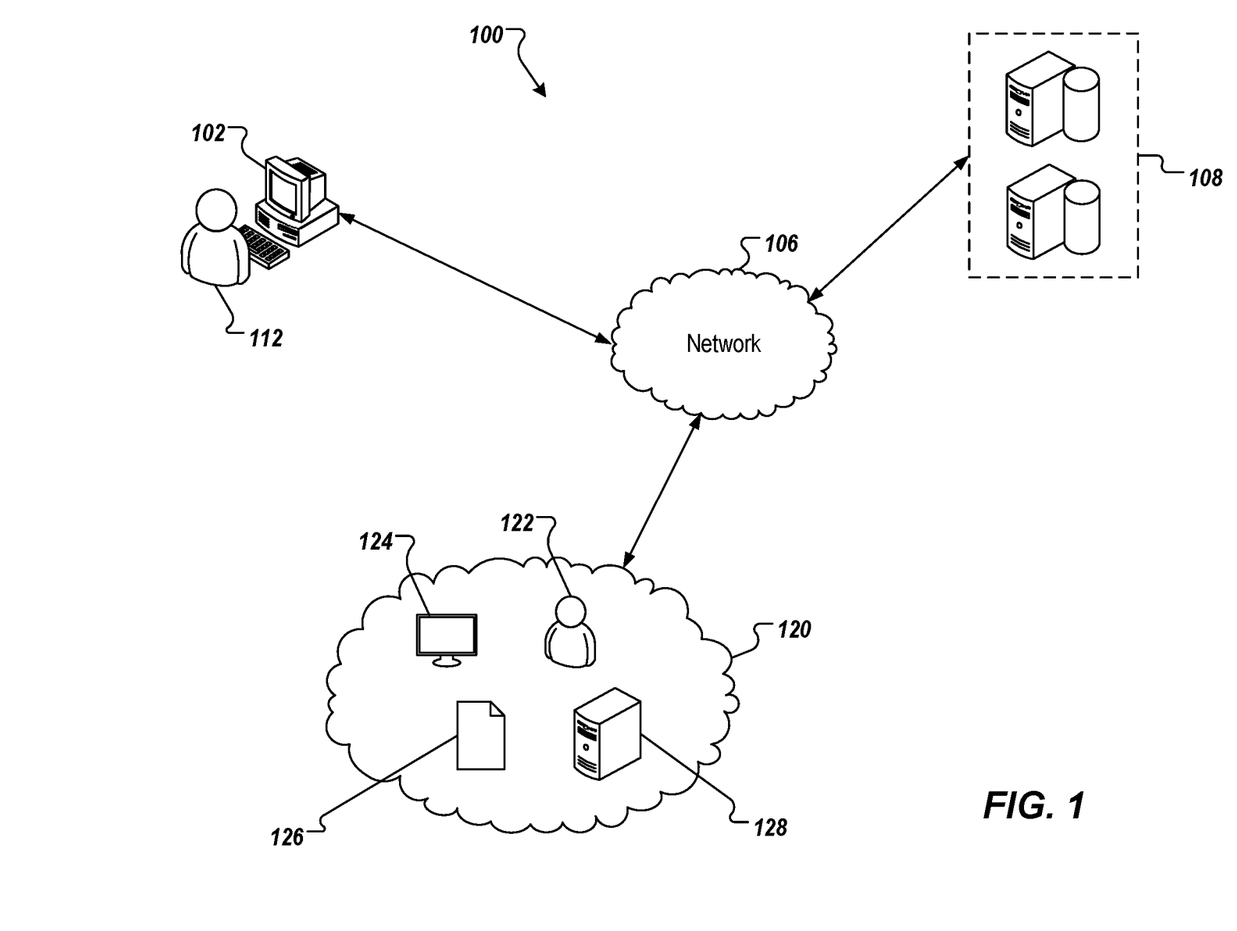
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host a process discovery platform in accordance with implementations of the present disclosure.

In the example of FIG. 1, an enterprise network 120 is depicted. The enterprise network 120 represents a computer network implemented by an enterprise to perform its operations. That is, one or more processes that support enterprise operations are executed within the enterprise network 120. In some examples, the enterprise network 120 represents on-premise systems (e.g., local and/or distributed), cloud-based systems, and/or combinations thereof. In some examples, the enterprise network 120 includes IT components and OT components. In general, IT components include hardware (e.g., computing devices, servers, computers, mobile devices) and software used to store, retrieve, transmit, and/or manipulate data within the enterprise network 120. In general, OT components include hardware and software used to monitor and detect or cause changes in processes within the enterprise network 120. In some examples, the enterprise network 120 includes multiple assets (e.g., CIs). Example assets include, without limitation, users 122, computing devices 124, electronic documents 126, and servers 128.

In some implementations, the process discovery platform of the present disclosure is hosted within the server system 108. As described in further detail herein, the process discovery platform analyzes traffic patterns that are generated through execution of processes within the enterprise network 120 to provide a process model for each process. The process model can be described as a pattern that generically represents execution of the process within the enterprise network 120. In some examples, the process model can be represented in a graph structure. Example graph structures can include, but are not limited to, a petri-net and a causal-net. In accordance with implementations of the present disclosure, subsequent traffic patterns can be compared to process models to identify instances of actual execution of a process (where actual refers to non-simulated execution of the process). For example, if a traffic pattern matches a process model, the traffic pattern is representative of execution of the process that is associated with the process model.

Figure 2:
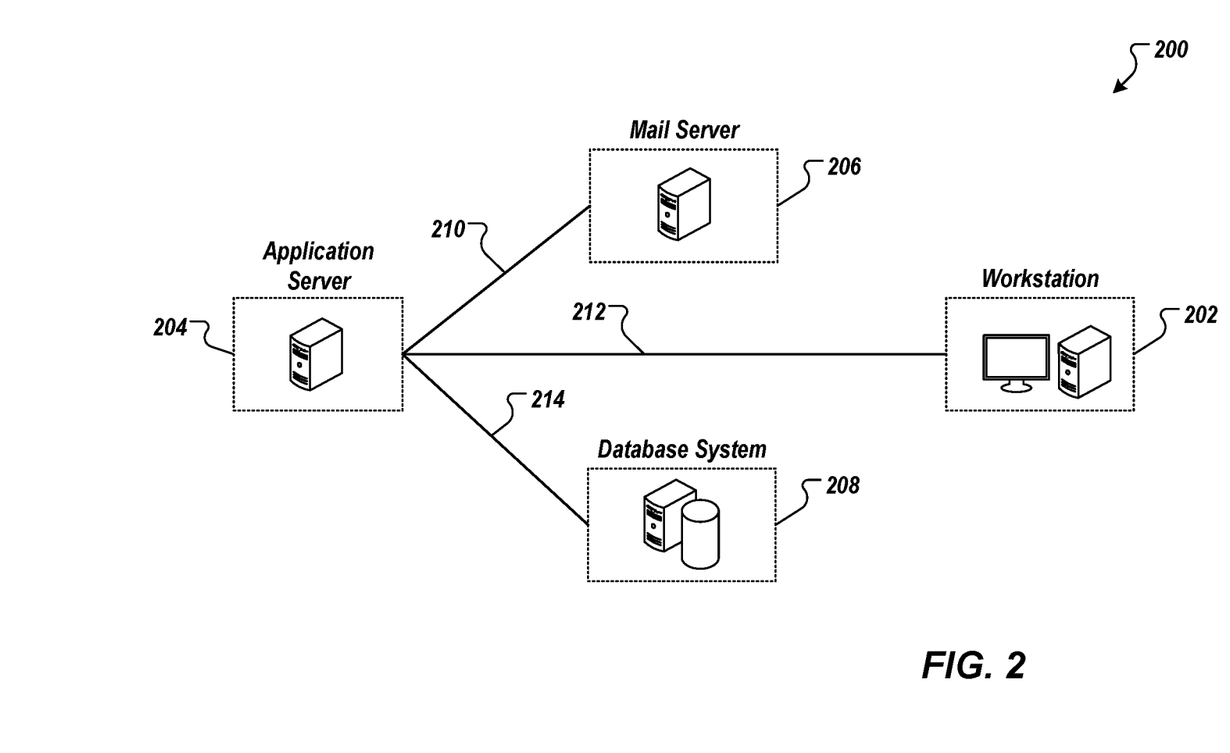
FIG. 2 depicts an example computer network in accordance with implementations of the present disclosure.

FIG. 2 depicts an example portion 200 of a computer network. The example portion 200 graphically represents a network topology of an enterprise network. In some examples, the computer network is graphically represented as nodes 202, 204, 206, 208 and edges 210, 212, 214 between nodes. In some examples, each edge can be associated with a respective session representing communication between nodes. While the example portion 200 of the computer network includes relatively few nodes, it is contemplated that a computer network can include hundreds, or thousands of nodes.

Figure 3:
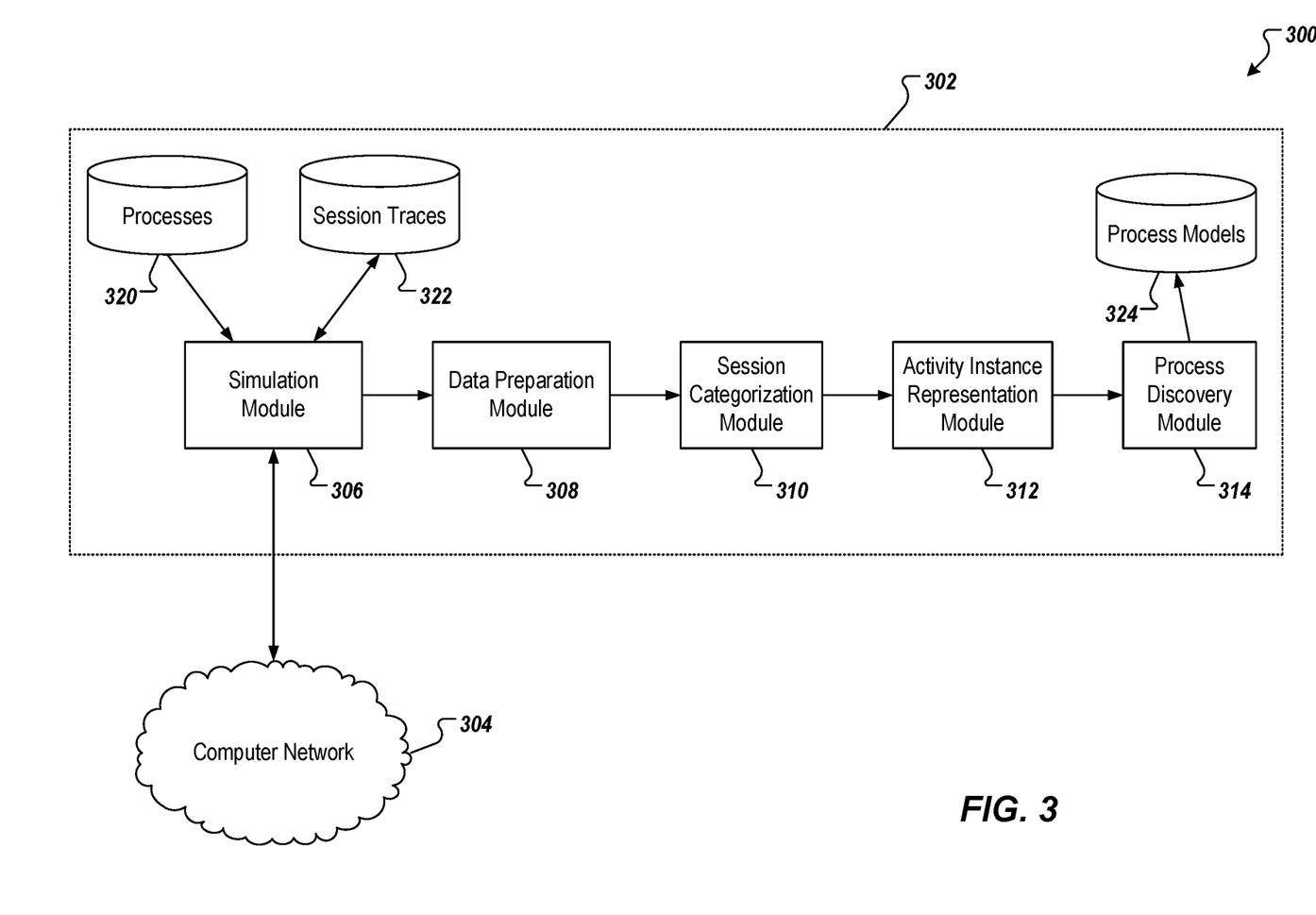
FIG. 3 depicts an example conceptual architecture in accordance with implementations of the present disclosure.
Figure 4:
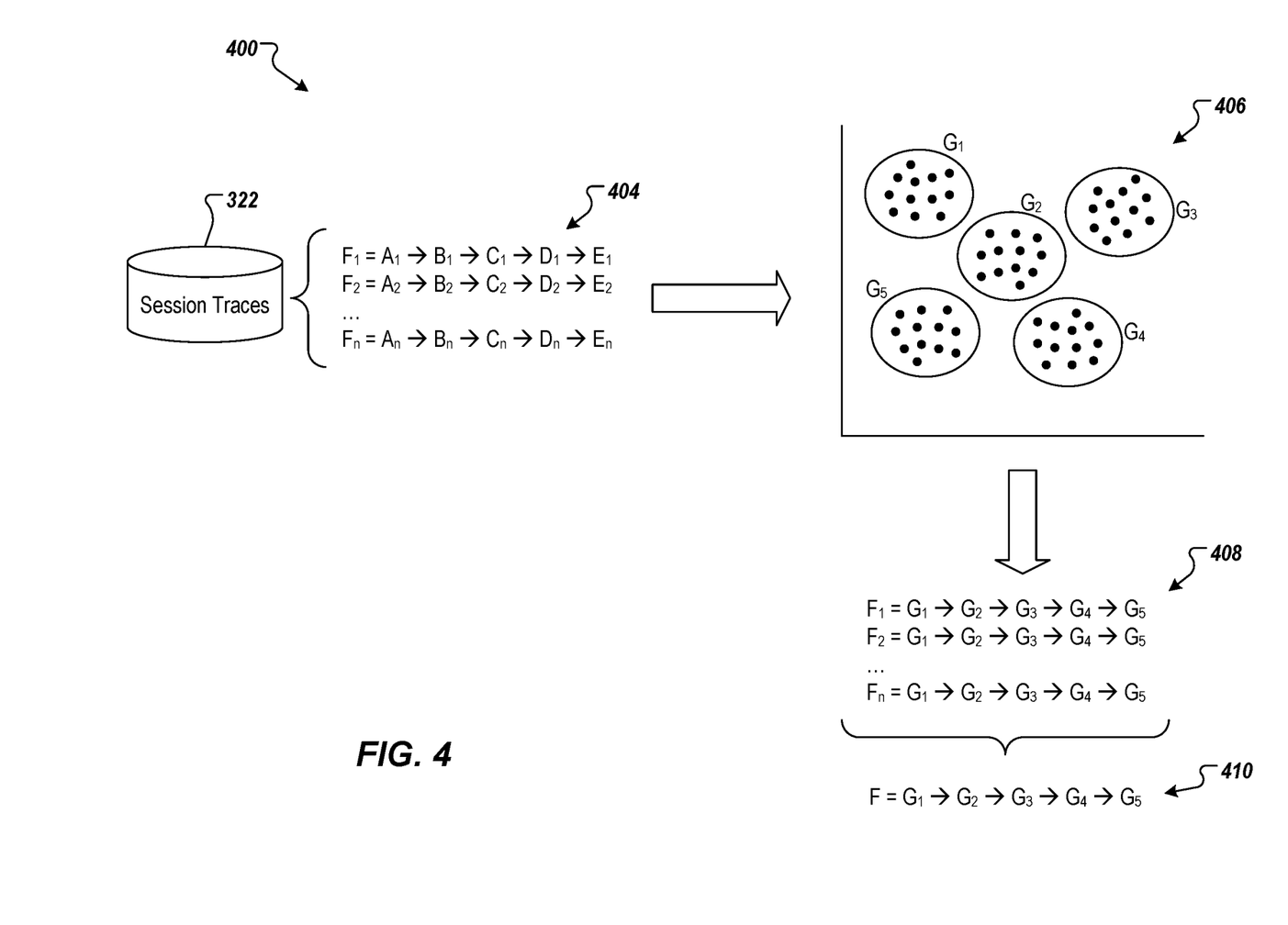
FIG. 4 depicts an example process model generation flow in accordance with implementations of the present disclosure.

Implementations of the automated process discovery of the present disclosure are described in further detail herein with reference to FIGS. 3 and 4. FIG. 3 depicts an example conceptual architecture 300 in accordance with implementations of the present disclosure. FIG. 4 depicts an example process model generation flow 400 in accordance with implementations of the present disclosure.

With particular reference to FIG. 3, the conceptual architecture 300 includes a process discovery platform 302 and a computer network 304. As described in further detail herein, the process discovery platform 302 performs automated process discovery on the computer network 304 to provide a set of process models, each process model representing network traffic flow within the computer network 304 for execution of a respective process. In some examples, each process model can be represented in a graph structure. Example graph structures can include, but are not limited to, a petri-net and a causal-net.

In further detail, and in the example of FIG. 3, the process discovery platform 302 includes a simulation module 306, a data preparation module 308, a session categorization module 310, an activity instance representation module 312, and a process discovery module 314. The process discovery platform 302 further includes a processes store 320, a session traces store 322, and a process models store 324. As described in further detail herein, one or more processes stored within the processes store 320 are executed within the computer network 304 to generate session traces that are stored in the session traces store 322. The session traces are processed to generate, for each process, a process model that is stored in the process models store. Each process model represents network traffic flow within the computer network 304 for a respective process.

In some implementations, the simulation module 306 retrieves a process from the process store 320. In some examples, the process can include computer-executable instructions that define a set of activities to be executed within the computer network 304 to perform the process. That is, the process is at least partially defined as the set of activities, each activity being performed within the computer network 304 to execute the process.

An example process can include, without limitation, a recruitment process executed as part of enterprise operations. For example, a user (e.g., a candidate) can be granted (limited) access to a human capital management (HCM) system of an enterprise to submit and/or update a resume, another user (e.g., recruiter for the enterprise) can access the resume within the HCM system and provide a review result (e.g., accepted, declined) that is stored within the HCM system, and a message (e.g., email) can be triggered from the enterprise to the candidate to inform the candidate of a result (e.g., accepted, declined). The example process is executed based on sessions between components within the network. For example, and without limitation, a first session is between a client device and an application server to enable the candidate to submit/update the resume, a second session is between the application server and a database server to store the resume, a third session is between a client device and the application server to enable the recruiter to review the resume and input a review result, a fourth session is between the application server and the database server (or another database server) to store the review results, and a fifth session is between the application server and a mail server to trigger sending of the message to the candidate.

In some examples, the simulation module 306 executes the process within the network 304 and receives session datasets representative of execution of the process within the computer network 304. In some examples, the session datasets are provided from session logs that are generated in response to execution of the process within the computer network 304. As described in further detail herein, the session datasets are used to provide a session trace. In some examples, each session trace includes a set of sessions, where each session represents a session between multiple components within the computer network 304. Accordingly, the session trace can be described as a network traffic stream (e.g., a sequence of sessions) representative of execution of the process within the computer network 304.

In further detail, each session can be described as communication (e.g., transport of messages) between network components (e.g., IT components). Each session has a start time, an end time, and one or more tasks that are performed to execute a respective activity in the set of activities. In some examples, each session (also referred to herein as session instance) occurs between two network components and is defined in a respective session dataset. Example data in a session dataset includes, without limitation, identifiers (e.g., source IP address, source port, destination IP address, destination port) and a set of features. Example features can include, without limitation, a payload (e.g., content of transferred data), a header (e.g., header properties of a packet), time-series (e.g., session start, session end, inter-arrival time between packets), and statistics (e.g., number of packets transferred, number of bytes transferred).

In some implementations, sessions are executed during a data acquisition phase to generate the session dataset for each session. In some examples, a process is executed multiple times within the computer network 304 by the simulation module 306 and, for each execution, session datasets are provided. For example, and without limitation, a process F can be executed n times within the computer network (e.g., $F_1, \ldots, F_n$). For each execution, a session dataset is generated for each session occurring during the execution and is stored (e.g., in the session trace store 322).

In some implementations, a session trace is defined for each execution of the process F during a data preparation phase. That is, for each execution of the process F (e.g., $F_1, \ldots, F_n$), sessions that occurred within the computer network 304 during the execution are assembled into a session trace S (e.g., $S_1, \ldots, S_n$), which can be described as a sequence of sessions. In some examples, the sequence of sessions is determined based on time-series data defined within session datasets of respective sessions. In some examples, a start time is determined for each session, and the sessions are put in sequence based on start times.

With reference to FIG. 4, a set of session traces 404 is depicted, each session trace corresponding to a respective execution of the process F. In the depicted example, each instance of execution of the process F is represented as a session trace. For example, a first execution of the process F (denoted as $F_1$) is represented as a first session trace ($S_1$), which includes $A_1 \rightarrow B_1 \rightarrow C_1 \rightarrow D_1 \rightarrow E_1$, a second execution of the process F (denoted as $F_2$) is represented as a second session trace ($S_2$), which includes $A_2 \rightarrow B_2 \rightarrow C_2 \rightarrow D_2 \rightarrow E_2$, and so on. Here, each session is represented, without limitation, as A, B, C, D, and E. In this example, the order (sequence) of the sessions within the session traces is determined based on respective start times of the sessions (e.g., A has a start time that is earlier than a start time of B, B has a start time that is earlier than a start time of C, and so on).

In some implementations, the set of session traces for the process F is provided to the session categorization module 310, which processes the set of session traces to categorize respective sessions across session traces in the set of session traces. In some examples, the sessions are categorized using a clustering algorithm. For example, the session data for each session is processed through the clustering algorithm to cluster (categorize) the sessions into two or more groups. That is, sessions can be clustered based on the identifiers (e.g., source IP address, source port, destination IP address, destination port) and/or the set of features (e.g., payload, header, time-series, statistics).

An example clustering algorithm includes hierarchical clustering, which can be described as a recursive partitioning of a dataset (e.g., sessions in the set of session traces) into clusters at an increasingly finer granularity. Hierarchical clustering is described in further detail in V. Cohen-addad, V. Kanade, F. Mallmann-trenn and C. Mathieu, "Hierarchical Clustering: Objective Functions and Algorithms," Journal of the ACM (JACM)—Networking, Computational Complexity, Design and Analysis of Algorithms, Real Computation, Algorithms, Online Algorithms and Computer-aided Verification, Vol. 66, No. 4 (2019), which is expressly incorporated herein by reference in the entirety. In some examples, hierarchical clustering uses either an agglomerative or divisive method to build a hierarchy of clusters based on a distance similarity measure to combine or split clusters. This can be recursively performed until there is only one cluster left or clusters can no longer be split. It is contemplated, however, that implementations of the present disclosure can be realized using any appropriate clustering algorithm.

With reference to FIG. 4, an example clustering 406 is depicted for the set of session traces 404. In the example of FIG. 4, a set of clusters (groups, categories) is provided and includes $G_1$, $G_2$, $G_3$, $G_4$, and $G_5$. For example, $G_1 = \{A_1, A_2, \ldots, A_n\}$, $G_2 = \{B_1, B_2, \ldots, B_n\}$, $G_3 = \{C_1, C_2, \ldots, C_n\}$, $G_4 = \{D_1, D_2, \ldots, D_n\}$, and $G_5 = \{E_1, E_2, \ldots, E_n\}$. Here, $G_1$, $G_2$, $G_3$, $G_4$, and $G_5$ are labels assigned to respective clusters that enable instances of sessions in one cluster to be distinguished from instances of sessions in another cluster. For example, one label can represent a connection session (e.g., connection between an application server and a database server to update a table), and another label can represent a message session (e.g., connection between an application server and a mail server to trigger sending of a message).

In some implementations, the set of session traces and the set of clusters are provided to the activity instances representation module 312, which processes both to provide a set of activity traces, each activity trace corresponding to a respective session trace in the set of session traces. In some examples, an activity trace is provided for a respective execution of the process F, by replacing each session within a respective session trace with the category (cluster, group) the session was clustered into. With reference to the example of FIG. 4, and without limitation, the set of session traces 404 can be processed to provide a set of activity traces 408. For example, the first session trace ($S_1$), which includes $A_1 \rightarrow B_1 \rightarrow C_1 \rightarrow D_1 \rightarrow E_1$, results in a first activity trace $G_1 \rightarrow G_2 \rightarrow G_3 \rightarrow G_4 \rightarrow G_5$, the second session trace ($S_2$), which includes $A_2 \rightarrow B_2 \rightarrow C_2 \rightarrow D_2 \rightarrow E_2$, results in a second activity trace $G_1 \rightarrow G_2 \rightarrow G_3 \rightarrow G_4 \rightarrow G_5$, and so on.

In some implementations, the set of activity traces is provided to the process discovery module 314, which provides a process model for the process F. In some examples, the process model can be represented in a graph structure. Example graph structures can include, but are not limited to, a petri-net and a causal-net. In some examples, the process discovery module 314 executes one or more process discovery techniques to generate the process model from the set of activity instances of the process F. The process model can be described as a generic trace of session categories determined from the set of activity instances. An example process model 410 is depicted in FIG. 4 (e.g., $F=G_1 \rightarrow G_2 \rightarrow G_3 \rightarrow G_4 \rightarrow G_5$). Example process discovery techniques can include, without limitation, an alpha-algorithm and an inductive miner, fuzzy-miner, and those described in W. Van Der Aalst, "From Event Logs to Process Models," in *Process mining: discovery, conformance and enhancement of business processes*, Springer, 2011, pp. 125-187, which is expressly incorporated herein by reference in the entirety. It is contemplated, however, that implementations of the present disclosure can be realized using any appropriate process discovery technique.

In accordance with implementations of the present disclosure, and as described herein, each process model can be described as a generic network traffic trace for execution of a process. That is, a process model is a generalization that abstracts over finer-grained differences between instances of execution of the same process. In this manner, execution of the process can be identified within the network regardless of differences in executions of the process. For example, and with non-limiting reference to the example process described above (e.g., recruitment through HCM system), a first instance of the process can be executed for a first candidate, and a second instance of the process can be executed for a second candidate. Consequently, data differs between the first instance and the second instance (e.g., IP address of candidate's computing devices, resume data of the respective candidates, review result between the candidates). Even though the finer-grained details differ, implementations of the present disclosure enable the first instance and the second instance to both be identified as execution of the same process using the process model provided for the process.

In accordance with implementations of the present disclosure, the process models generated by the process discovery platform can be used in multiple use cases. Example use cases can include, without limitation, performing automated process discovery based on network traffic streams in a live computer network (e.g., live referring to execution of processes in support of actual enterprise operations, as opposed to simulation of execution of processes used to generate the process models, as described herein), mapping between processes and infrastructure assets and to provide knowledge on potential attack paths when analyzing enterprise readiness to cyber-attack, and automated labeling of activities over network traffic streams to support machine-learning (ML) approaches.

With regard to performing automated process discovery based on network traffic streams in a live computer network, network traffic patterns can be collected during enterprise operations. One or more network traffic patterns can be compared to process models within a set of process models, each process model in the set of process models being generated by the process discovery platform of the present disclosure, as described herein. In some examples, if a network traffic pattern is determined to sufficiently match a process model, the network traffic pattern can be determined to correspond to the process associated with the process model. Further, and in another example use case, the infrastructure assets identified in the matching network traffic pattern can be mapped to the process. That is, the specific infrastructure assets (e.g., IT components) that execute the process can be identified. In this manner, knowledge on potential attack paths is provided for analyzing enterprise readiness to cyber-attack. For example, knowledge on which components are executing which processes enable assessment on the impact a cyberattack would have on enterprise operations (e.g., which processes would be impacted and to what extent, if a particular component were compromised).

With regard to supporting ML approaches, the process models generated in accordance with implementations of the present disclosure can be used as training data to train one or more ML models. For example, one or more ML models can be used to monitor network traffic and perform certain functionality (e.g., alert to anomalous activity, identify instances of processes being executed within a network). That is, for example, an ML model can receive network traffic as input, process the network traffic, and provide output (e.g., an alert indicating anomalous activity and/or an instance of process execution). To enable this, the ML model is trained using training data. In this case, the training data can include processes and respective process models. For example, each process model is labeled with a respective process that it represents to provide labeled training data for supervised learning of the ML model.

In general, a ML model is iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

Figure 5:
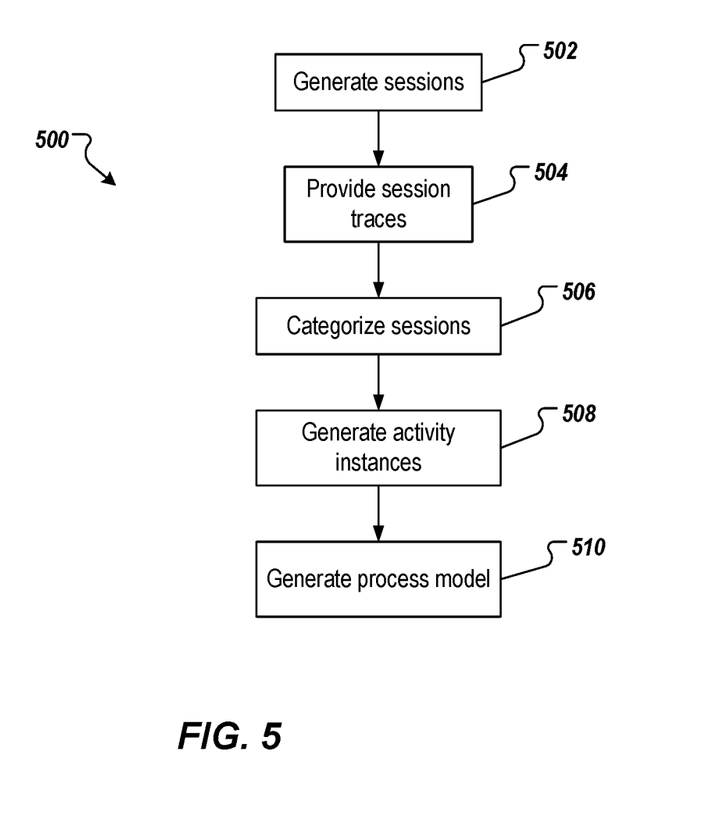
FIG. 5 depicts an example process that can be executed in accordance with implementations of the present disclosure.

FIG. 5 depicts an example process 500 that can be executed in accordance with implementations of the present disclosure. In some implementations, the example process 500 may be performed using one or more computer-executable programs executed using one or more computing devices. In some examples, the example process 500 can be executed for each of one or more processes executed during enterprise operations to provide a process model for each process.

Sessions are generated (502). For example, and as described herein, the simulation module 304 of FIG. 3 executes the process within the network 304 and receives session datasets representative of execution of the process within the computer network 304, where the simulation module 306 retrieves a process from the process store 320. In some examples, the process can include computer-executable instructions that define a set of activities to be executed within the computer network 304 to perform the process. The process is executed multiple times within the computer network 304 by the simulation module 306 and, for each execution, session datasets are provided.

A set of session traces is provided (504). For example, and as described herein, the session datasets are used to provide a session trace for each execution of the process. In some examples, each session trace includes a set of sessions, where each session represents a session between multiple components within the computer network 304. That is, for each execution of the process, sessions that occurred within the computer network 304 during the execution are assembled into a session trace, which can be described as a sequence of sessions. In some examples, the sequence of sessions is determined based on time-series data defined within session datasets of respective sessions. In some examples, a start time is determined for each session, and the sessions are put in sequence based on start times.

Sessions are categorized (506). For example, and as described herein, the set of session traces for the process is provided to the session categorization module 310, which processes the set of session traces to categorize respective sessions across session traces in the set of session traces. In some examples, the sessions are categorized using a clustering algorithm, such as hierarchical clustering. A set of activity instances is generated (508). For example, and as described herein, the set of session traces and the set of clusters are provided to the activity instances representation module 312, which processes both to provide a set of activity traces, each activity trace corresponding to a respective session trace in the set of session traces. In some examples, an activity trace is provided for a respective execution of the process, by replacing each session within a respective session trace with the category (cluster, group) the session was clustered into.

A process model is generated (510). For example, and as described herein, the set of activity traces is provided to the process discovery module 314, which provides a process model for the process. In some examples, the process discovery module 314 executes one or more process discovery techniques to generate the process model from the set of activity instances of the process. The process model can be described as a generic trace of session categories determined from the set of activity instances.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for process discovery in a computer network based on session traffic, the method being executed by one or more processors and comprising:
   executing, within a computer network, multiple instances of a process, each instance comprising a simulation of execution of the process within the computer network;
   receiving session datasets representative of sessions performed during execution of each instance of the process;
   generating a set of session traces, each session trace representing a sequence of sessions performed during an instance of the process within the computer network;
   processing the set of session traces using a clustering algorithm to cluster sessions of each session trace into two or more clusters, each cluster having an associated label;
   providing a process model that generically represents multiple executions of the process within the computer network, the process model comprising a sequence of labels of the two or more clusters corresponding to session traces in the set of session traces;
   comparing network traffic of actual execution of processes within the computer network to a set of process models, the set of process models comprising the process model; and
   identifying the process as having been actually executed in the computer network based on the comparing.

2. The method of claim 1, wherein the clustering algorithm comprises a hierarchical clustering algorithm.

3. The method of claim 1, further comprising generating a set of activity traces based on the set of session traces and labels of the two or more clusters.

4. The method of claim 1, wherein the process model is provided based on a process discovery technique that is executed on the set of activity traces.

5. The method of claim 1, further comprising training a machine-learning (ML) model at least partially based on the process model.

6. The method of claim 1, wherein the computer network assets comprise information technology (IT) components and operational technology (OT) components, each session being associated with communication between multiple IT components.

7. A non-transitory computer-readable storage medium coupled to one or more processors and having instructions stored thereon which, when executed by the one or more processors, cause the one or more processors to perform operations for process discovery in a computer network based on session traffic, the operations comprising:
   executing, within a computer network, multiple instances of a process, each instance comprising a simulation of execution of the process within the computer network;
   receiving session datasets representative of sessions performed during execution of each instance of the process;
   generating a set of session traces, each session trace representing a sequence of sessions performed during an instance of the process within the computer network;
   processing the set of session traces using a clustering algorithm to cluster sessions of each session trace into two or more clusters, each cluster having an associated label;
   providing a process model that generically represents multiple executions of the process within the computer network, the process model comprising a sequence of labels of the two or more clusters corresponding to session traces in the set of session traces;
   comparing network traffic of actual execution of processes within the computer network to a set of process models, the set of process models comprising the process model; and
   identifying the process as having been actually executed in the computer network based on the comparing.

8. The computer-readable storage medium of claim 7, wherein the clustering algorithm comprises a hierarchical clustering algorithm.

9. The computer-readable storage medium of claim 7, wherein operations further comprise generating a set of activity traces based on the set of session traces and labels of the two or more clusters.

10. The computer-readable storage medium of claim 7, wherein the process model is provided based on a process discovery technique that is executed on the set of activity traces.

11. The computer-readable storage medium of claim 7, wherein operations further comprise training a machine-learning (ML) model at least partially based on the process model.

12. The computer-readable storage medium of claim 7, wherein the computer network assets comprise information technology (IT) components and operational technology (OT) components, each session being associated with communication between multiple IT components.

13. A system, comprising:
one or more computers; and
a computer-readable storage device coupled to the computing device and having instructions stored thereon which, when executed by the computing device, cause the computing device to perform operations for process discovery in a computer network based on session traffic, the operations comprising:
executing, within a computer network, multiple instances of a process, each instance comprising a simulation of execution of the process within the computer network;
receiving session datasets representative of sessions performed during execution of each instance of the process;
generating a set of session traces, each session trace representing a sequence of sessions performed during an instance of the process within the computer network;
processing the set of session traces using a clustering algorithm to cluster sessions of each session trace into two or more clusters, each cluster having an associated label;
providing a process model that generically represents multiple executions of the process within the computer network, the process model comprising a sequence of labels of the two or more clusters corresponding to session traces in the set of session traces;
comparing network traffic of actual execution of processes within the computer network to a set of process models, the set of process models comprising the process model; and
identifying the process as having been actually executed in the computer network based on the comparing.

14. The system of claim 13, wherein the clustering algorithm comprises a hierarchical clustering algorithm.

15. The system of claim 13, wherein operations further comprise generating a set of activity traces based on the set of session traces and labels of the two or more clusters.

16. The system of claim 13, wherein the process model is provided based on a process discovery technique that is executed on the set of activity traces.

17. The system of claim 13, wherein operations further comprise training a machine-learning (ML) model at least partially based on the process model.

* * * * *